Oct. 11, 1966   J. D. BROWN ETAL   3,278,311
METHOD OF MANUFACTURING CORN DOUGH AND CORN CHIPS
Filed May 10, 1965   5 Sheets—Sheet 1

INVENTORS
EDWARD E. ANDERSON
JACK D. BROWN
BY Kenway, Jenney & Hildreth

ATTORNEYS

Oct. 11, 1966    J. D. BROWN ETAL    3,278,311
METHOD OF MANUFACTURING CORN DOUGH AND CORN CHIPS
Filed May 10, 1965    5 Sheets-Sheet 2

INVENTORS
EDWARD E. ANDERSON
JACK D. BROWN
BY *Kenway, Jenney, Hildreth*

ATTORNEYS

Oct. 11, 1966  J. D. BROWN ETAL  3,278,311
METHOD OF MANUFACTURING CORN DOUGH AND CORN CHIPS
Filed May 10, 1965  5 Sheets-Sheet 4

INVENTORS
JACK D. BROWN
EDWARD E. ANDERSON
BY Kenway, Jenney & Hildreth

ATTORNEYS

Oct. 11, 1966  J. D. BROWN ETAL  3,278,311
METHOD OF MANUFACTURING CORN DOUGH AND CORN CHIPS
Filed May 10, 1965  5 Sheets-Sheet 5

INVENTORS
JACK D. BROWN
EDWARD E. ANDERSON
BY Kenway, Jenney, Hildreth

ATTORNEYS 3,278,311
METHOD OF MANUFACTURING CORN DOUGH AND CORN CHIPS
Jack D. Brown, Dallas, Tex., and Edward E. Anderson, Lexington, Mass., assignors to Morton Foods, Inc., Dallas, Tex., a corporation of Texas
Filed May 10, 1965, Ser. No. 459,142
14 Claims. (Cl. 99—80)

The present application is a continuation-in-part of our United States patent applications Serial No. 184,037 filed April 2, 1962, entitled, "Method and Apparatus for the Manufacture of Corn Chips," now abandoned and Serial No. 184,442 filed April 2, 1962, entitled, "Method and Apparatus for Preparing Corn Dough," now abandoned.

Our invention relates to an improved method for making a snack item and more particularly for making such an item from corn.

Snack items normally known as "corn chips" are now very widely sold. It is customary in making such corn chips to cook the corn in the presence of lime, steep the processed corn and from this corn form a dough which is extruded as discrete pieces into hot fat to be cooked. It will be appreciated that by this method there are definite limitations on the size, shape and flavor characteristics of the corn chip thus formed. The limitations on size and shape associated with extruding the dough into the deep fat may be overcome by rolling and cutting the dough to form shapes. However, this is not easy to accomplish. U.S. Patent 2,905,559 discloses that it is possible to form sheets of dough and to cut this dough into predetermined shapes and fry them in deep fat provided the dough is perforated by docking before frying in such a way that the perforations thus formed remain throughout the corn chip after it is cooked. While the process disclosed in the above-identified United States patent is useful with masa dough prepared by conventional processes (for example as in U.S. Patent 2,002,053) we have now found that by a unique combination of steps it is possible to provide an improved method of making corn chips and in particular a new method of dough formation which has a number of important advantages over the prior art. Among these advantages are the achievement of a continuous operation from the cooking of the corn kernels to the packaging of the finished chips, the ability to run this operation at high speed, the elimination of a washing step prior to grinding, the attainment of better quality control, the ability to make the final product in any desired shape and size, and the achievement of better flavor in the finished corn chips.

By processing the corn kernels in the manner of our invention we may provide corn dough in thin sheets particularly well suited to the docking and cutting process described in U.S. Patent 2,905,559.

The method of this invention involves the processing of the raw corn kernels, and the cutting and kneading and milling of the processed kernels in such a way as to form a dough which can be sheeted, docked, cut and cooked to form the corn chips.

One of the major problems presented in providing a continuous process of corn chip manufacture is that of treating processed corn kernels, which have their hulls loosened or removed and which are penetrated with lime, to make a sheetable corn dough. Normally, doughs are formed from a number of components, for example a finely comminuted dry material (flour, meal or the like) to which are added liquids, shortenings and flavors. However, in the preparation of corn chips it is desirable for the attainment of the limed corn flavor to form the dough from lime treated corn kernels alone without adding any other ingredients. Thus normal dough forming methods are not useable in the conversion of the processed corn kernels to the dough needed for sheeting and subsequent cutting.

In the process of forming the dough from the corn kernels it is of course necessary to comminute the processed kernels which generally still retain essentially their original shape and size after cooking. We have found that the manner in which corn kernels are comminuted and the way in which the resulting comminuted material is further treated are critical aspects of making a corn dough from processed corn kernels.

In the prior art of corn chip manufacture, the dough is formed by grinding the kernels between stone grinding surfaces. The comminuted corn kernels are then formed into a loaf or similar shape termed a "masa." The masa dough is then extruded directly into hot cooking oil. Dough formed in this manner cannot, however, be sheeted out, probably because this type of grinding achieves too fine a comminution which in turn brings about a breakdown of the corn kernels into a material which cannot be readily plasticized or kneaded for subsequent rolling into dough sheets. It is not entirely understood why this is true but it may be postulated that too fine comminution as achieved in stone grinding frees the oils and other constituents of the corn kernels to the extent that there remains no homogeneous mass for sheet formation. Moreover, stone grinding is not acceptable for a continuous commercial process for forming corn chips. The grinders possess an inherent low capacity and they are uneconomical to use inasmuch as the stones require frequent refacing. Moreover, stone grinding requires a preliminary washing of the processed corn kernels and the addition of water during grinding. These latter requirements detract from the flavor of the finished corn chip.

There are of course available other types of grinding devices such as, for example, the well-known meat grinder which contains a rotating screw in an essentially cylindrical body having an end plate through which the material is forced and cutting knives to remove the material after grinding. In grinders of this type, reduction in size is primarily achieved by the process of attrition. However, these grinders alone are not suitable for handling the processed corn. Although it is possible to grind processed corn kernels in such grinders, the temperature of the dough increases so rapidly that the resulting material becomes sufficiently sticky to materially slow down the grinder, and finally stop it. Accordingly cooling of the grinder is required, which is not only difficult to achieve but uneconomical to operate. Moreover, exceedingly large capacity grinders are required to handle sufficient quantities of kernels to achieve commercial production. Finally, grinding the corn in this manner and bringing the dough to excessive temperatures detracts materially from the flavor of the finished corn chip.

It may be seen from the foregoing description that it has not been possible heretofore to make a suitable corn dough in an economical and commercially feasible way. Although it is possible to grind corn kernels in a screw and plate type grinder, such as described, the difficulties encountered preclude the use of this type of grinder alone in the formation of suitable dough from processed corn kernels. Therefore, in order to make corn chips by sheeting the dough and cutting it into desired configurations it is necessary to find a way to form a dough from processed corn kernels having physical characteristics which permit it to be rolled and sheeted and which is also economical of operation.

It is an important object of our invention to provide an improved method of making corn chips which includes the steps of sheeting out the dough and the cutting of it into desired configurations. It is another object of our invention to provide a method of the character described which permits an essentially continuous production of corn chips from raw kernels to finished product. It is yet another object of our invention to provide a method which is unique for the production of corn chips which exhibit improved flavor, texture and quality control.

Another object of our invention is to provide a method of readily converting processed corn kernels directly into a dough which can be readily sheeted out for cutting and further processing. It is a further object of our invention to provide a method of the character described which results in the production of dough possessing a controlled degree of plasticity and an improved flavor. Another object is to provide a method of forming corn dough which is rapid and which lends itself particularly well to incorporation in a continuous process of corn chip manufacture. It is still another object of our invention to provide a corn dough from processed corn kernels which lends itself to rolling and sheeting.

Other objects of our invention will in part be obvious and will in part be apparent hereinafter.

Our invention accordingly comprises the several steps and the relation of one or more of such steps with respect to each of the others, all as exemplified in the following detailed disclosure, and the scope of the invention will be indicated in the claims.

For a fuller understanding of the nature and objects of our invention, reference should be had to the following detailed description taken in connection with the accompanying drawings in which.

We have found that the improved corn chips of this invention may be continuously made with excellent quality control if the corn and the resulting dough are handled as described below in detail. By cooking or processing the raw corn in a specific manner, by effecting a rapid but efficient steeping of the processed corn, and by cutting the steeped corn to the desired particle size in a unique way and kneading and mixing the particles to form a dough which can be rolled into a thin sheet, the necessary conditions can be established whereby the dough sheets can be subsequently docked, cut into shapes, deep-fat fried and packaged. By the proper control of each of the steps described, it is possible to coordinate the method so that the dough may be handled in the desired manner. Each of the steps performed will be presented in detail with reference to the drawings.

*Processing the raw material*

The first step in the forming of the corn chips is the processing of the dried raw corn (preferably a mixture of white and yellow corn in kernel form) with lime to put the kernels in a condition where they may be further reduced in size and at the same time to impart the desired lime flavor. In the previous methods of processing corn to put it in condition for making dough for deep-fat frying, the corn has been cooked for a period of time in a lime solution and then permitted to steep for an extended period of time—sometimes as much as 24 hours. However, in order to make the process of this invention continuous and to eliminate the necessity of steeping the corn for an extended period of time, it has been found that the corn kernels can be cooked under pressure provided a sufficient quantity of lime, either alone or with other alkalies in combination, is employed. The actual cooking of the corn according to this improved process to put the corn kernels in condition for particle size reduction and dough formation is more fully described in a United States Patent No. 3,083,103 issued to Edward E. Anderson et al. and dated March 26, 1963, and assigned to the assignee of the present application.

Due to the nature of corn and particularly to the fact that the entire kernel (containing cellulose, starch, oil and protein) is used in our process, the steps must be directed to individually and collectively putting the corn and subsequently the dough in proper condition at all points in the process. The desired conditions to be obtained will be defined for each step in the following description. In the figures, FIGS. 1a and 1b combined illustrate the entire method of this invention in a preferred embodiment.

Figure 1A:
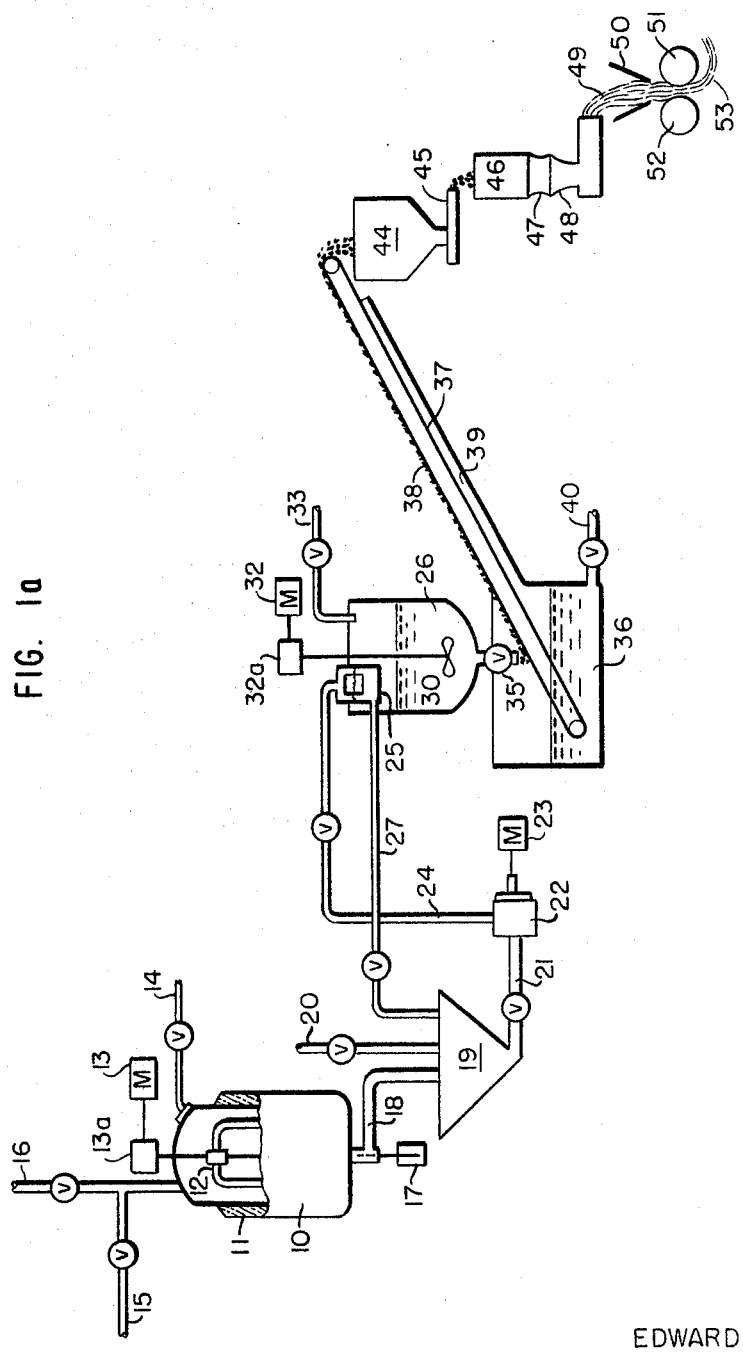
FIG. 1a is a schematic flow diagram illustrating the location, arrangement and types of apparatus and the order of steps utilized in the practice of the process of this invention up through the formation of the dough.

In FIG. 1a, it will be seen that the raw corn is treated with the necessary amount of lime and water in a pressure vessel 10 which has surrounding it a steam jacket 11 and which is equipped with an agitator 12 driven by motor 13, through gear box 13a. Appropriate conduits are provided for introducing the materials into the pressure vessel 10, such as conduit 14 for the corn and lime and conduit 15 for water or steam or both. There is also provided a pressure relief line 16 to control the pressure within the vessel 10 and to release the pressure when the processing of the corn kernels has been completed.

The quantities of lime and water with relationship to the amount of corn processed as well as the time and temperature conditions of pressure cooking are described in detail in the above-identified United States Patent No. 3,083,103. This application discloses that there are two important aspects in the processing of the corn kernels, namely the use of pressure and the use of lime in a quantity equivalent to at least 1.5% by weight of the dry corn. This pressure cooking produces a processed corn which requires only a brief steeping, thus making a continuous corn chip process possible if alternating cookers are used. More important however, it produces a processed corn which does not have to be washed, as was required in the prior processes.

After the corn has been processed under the desired conditions, pressure is released in the pressure vessel by means of the relief line 16, and by opening an air-operated valve 17, the processed corn, along with the liquid, is transferred through the conduit 18 into a pump hopper 19. At this point, the corn and associated liquid are at a temperature between about 210° and 220° F. Fresh cooling water is introduced through line 20 into the hot discharge from the pressure vessel to reduce the temperature to about 170° F. Subsequent to this cooling the processed corn and liquid are transferred through conduit 21, by means of pump 22 driven by motor 23, into a conduit 24 which leads into a corn-water separator 25 positioned in the upper part of a steeping tank 26. The corn-water separator 25 separates out a portion of the water and returns it via conduit 27 into the pump hopper 19 to provide an additional quantity of liquid for ease of pumping the processed corn to the steeping tank 26.

Figure 2:
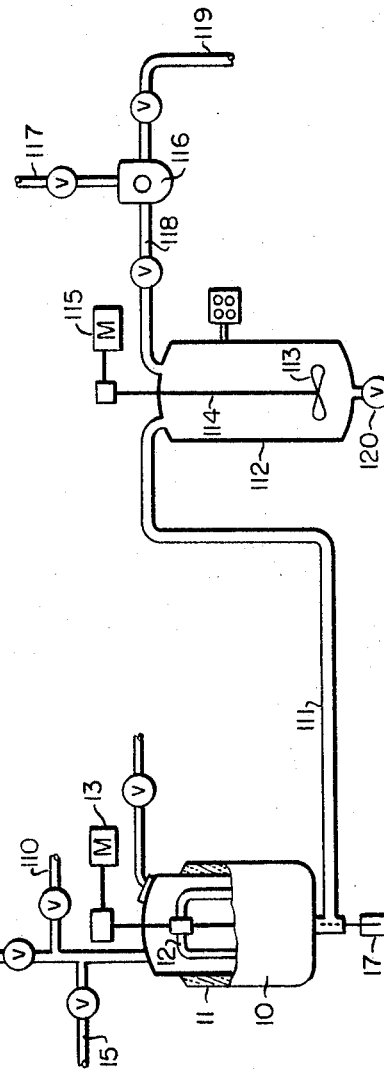
FIG. 2 is a diagram of an alternative apparatus for use in connection with the apparatus of FIG. 1a in handling the processed corn to the point where it is cut and plasticized.

Alternatively, the vessel 10 may be directly connected via a single conduit to the inlet to the steeping tank 26 (as shown for example in FIGURE 2). When the pressure cooking is completed, the valve 17 is opened and the pressure in the pressure vessel forces the liquid and corn through the conduit into the steeping tank 26. Here it must be immediately cooled since it has not had the cooling treatment provided in the pump hopper. To this end a conduit or pipe 33 is provided which is connected to a supply of cold, fresh water. When the cooked corn and liquid are introduced into the steeping tank by direct blow down as described above, cold fresh water is supplied to rapidly drop the temperature to about 170° F. During a 60-minute steeping period, the temperature will further drop, reaching about 160° F. at the end of the period.

Steeping is carried out for a relatively short period of time, preferably for about sixty minutes; however steeping times of between 30 minutes and two hours have been found satisfactory. Steeping is carried out in steeping tank 26 which is equipped with an agitator 30 which in turn is driven by motor 32 through a gear box 32a. The agitator 30 in the steeping tank 26 is not operated continuously but only periodically. The periodic stirring of the corn and liquid in the steeping tank is designed to disturb the interface between the corn kernel surface and liquid to get better lime penetration into the corn without wearing away the surface of the corn. In the process some husks from the corn kernels are, of course, removed, but it is preferred that the husk removal within the steeping tank and during the stirring process be maintained at a minimum since it is desirable to have husks as well as the other parts of the kernels in the formation of a dough suitable for sheeting. Moreover, the use of all of the kernel contributes to the flavor of the corn chip and to the attainment of high yield.

In the agitation of the corn and liquid in the steeping tank 26, it is preferred that the stirring be carried out for a few seconds about every 10 minutes. At the end of the steeping period the corn kernels are in the proper condition for dough formation. This means that the kernel husks are loosened but substantially all yet attached. In contrast to the prior art, no washing is required, in fact it is preferred to eliminate washing entirely.

We have also found that when the pressure cooked corn is transferred by direct blow-down from the pressure vessel as described above, the steeping time to achieve a given penetration of corn by the lime is materially reduced. For example, we have found that after direct blow-down the required time is reduced from the 60 minutes for conventionally transferred corn to about 40 minutes.

The corn, after steeping as noted above for about 30 minutes to two hours with the described periodic stirring, is in condition for transferral to the next step in the process. Positioned at the bottom of steeping tank 26 is valve 35 which when open permits the steeped processed corn and liquid to be discharged into a discharge tank 36. Directly under the discharge valve 35 is located an endless foraminous belt 37 which picks up the corn kernels 38 and permits final draining of the liquid therefrom into discharge tank 36 and a draining pan 39. The liquid thus removed from the corn kernels is periodically discharged from discharge tank 36 by means of a drain line 40. Corn falling through the small opening in the belt 38 and carried out of the discharge tank 36 through the conduit 40 may be recovered by a recovery system. Such a system might involve pumping the effluent through a screen for example. The recovered corn can be utilized in the remainder of the process.

The corn kernels conveyed by the foraminous belt are carried into a storage hopper 44 where they may be stored if desired before further processing. Although the processed corn can be stored at this stage of the process, this is not required. On the other hand, it is preferable to use the kernels while still warm in dough formation.

Formation of dough

By the method of our invention processed corn kernels are converted to a sheetable dough by two distinct steps which when performed in the order and in the manner described below result in a homogeneously kneaded or plasticized dough which can be passed through rollers and converted into a thin continuous sheet. The two steps of converting the processed corn kernels to dough include the cutting of the corn (as contrasted with grinding) in a cutting mill and the subsequent plasticizing of the resulting comminuted material in a modified worm and plate grinder.

Because the corn kernels are first cut rather than ground it is possible to control, through the control of particle size, the physical characteristics of the comminuted corn kernels. It is also possible to handle the processed corn kernels at an elevated temperature without cooling them since no great amount of heat is generated in their cutting. Thus it is possible to form the dough from kernels which, at the time they are introduced into the cutter, are at an elevated temperature, for example up to about 170° F. It appears that the wet starch in the corn kernels, when about 170° F. acts to lubricate the cutting knives in the cutting mill, thus permitting the cutting of the corn without a substantial temperature increase. Using warm kernels appears to be helpful also in achieving the plasticizing step. However, they may of course be introduced into the cutter at room temperature if they have been permitted to stand for a period of time after processing.

It is not understood precisely why the combination of cutting and plasticizing makes it possible to form the sheetable corn dough, but it is believed that by controlling the size to which the kernels are comminuted, such components of the kernels as oils, zein and other binder materials naturally occurring in the corn kernels are released only to the extent that they can be used to plasticize the comminuted material with the required amount of cohesion without producing an exceedingly sticky material as is produced in stone grinding for example. When cut and plasticized at somewhat above room temperature dough formation seens to be somewhat enhanced, due perhaps to some activation of the naturally occurring binder materials. By using the warm corn a very satisfactory dough results; and, moreover, it is not necessary to cool each batch of processed kernels to room temperature before grinding. However, as noted above, it is possible to form dough from corn kernels which have reached room temperature.

Cutting is carried out so that the resulting comminuted material has a maximum particle size ranging from about 0.020 to 0.050 inch. Comminuted material, the maximum particle size which is about 0.040, has been found to be very satisfactory in making a sheetable corn dough. It will be appreciated that in cutting, at least a minor portion of the comminuted material may be somewhat smaller than these sizes specified. Plasticizing is carried out until a uniformly consistent and well kneaded dough is formed.

From the storage hopper 44 in FIGURE 1a the processed corn kernels are carried by means of an adjustable screw feeder 45 into a cutting mill generally indicated at 46 and then by chute 47 into a plasticizer 48. The steps by which the kernels are reduced in size and then blended are critical to the formation of a corn dough which can be mechanically handled, that is rolled into a thin sheet, docked and cut.

Figure 3:
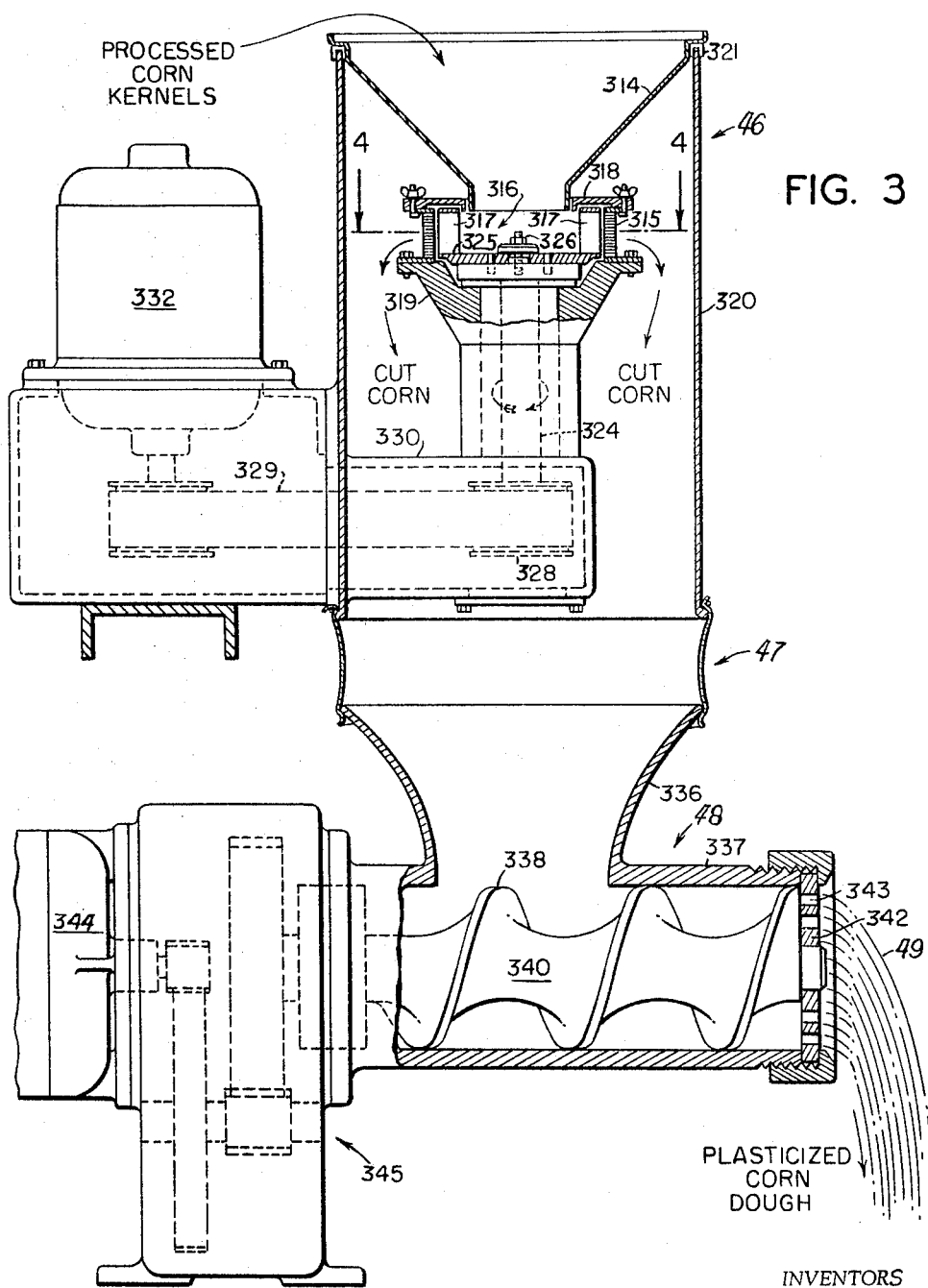
FIG. 3 is a vertical sectional view of the apparatus of this invention used in converting processed corn kernels to a plasticized corn dough.
Figure 4:
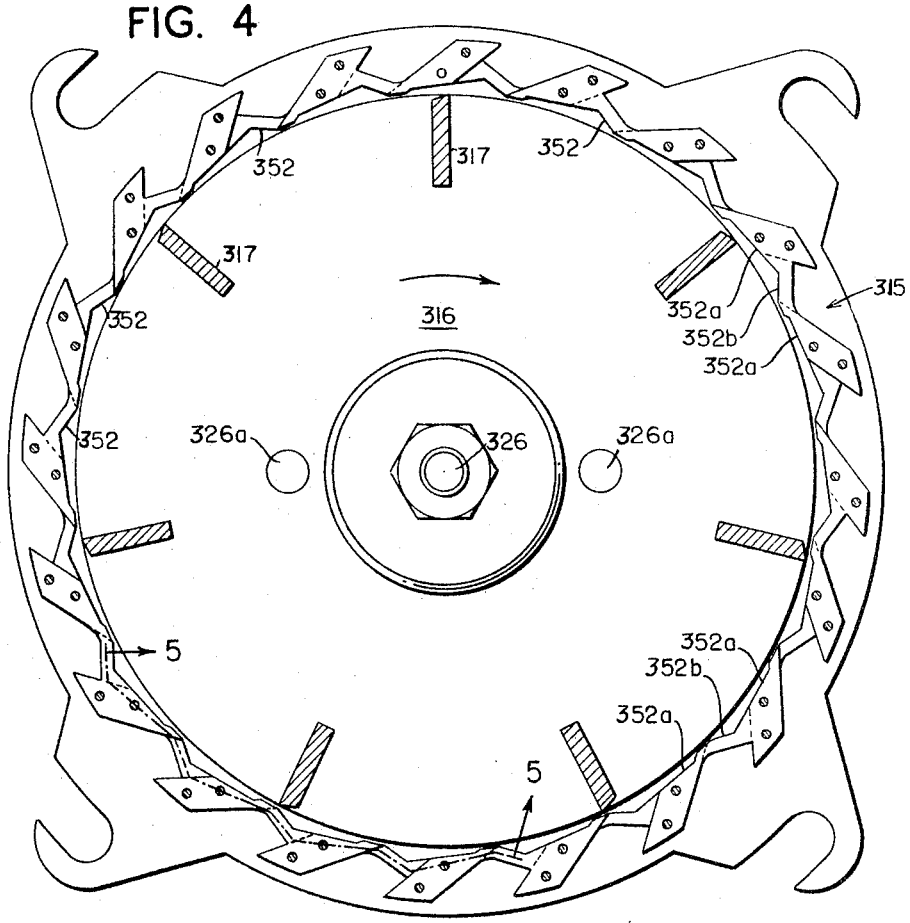
FIG. 4 is a horizontal cross-section of the cutting mill taken along line 4—4 of FIG. 3.
Figure 5:
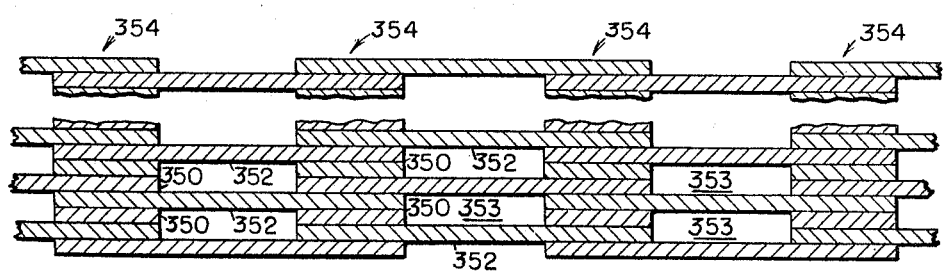
FIG. 5 is a fragmentary vertical cross-section of a portion of the cutting head taken along the line 5—5 of FIG. 2.

FIGURES 3–5 show in greater detail a typical cutting mill 46 and a plasticizer 44 which have been found to be particularly well adapted to making corn dough in accordance with this invention. The cutting mill as shown in FIGURE 3 is typified by cutting mills manufactured by Urschel Laboratories, Inc., of Valparaiso, Indiana, while the plasticizer is typified by screw grinders having perforated end plates such as a meat grinder sold by John E. Smith and Sons, Manufacturing Company of Buffalo, New York. In the following description and claims the term "cutting mill" is used to define any apparatus which is capable of comminuting the corn kernels within the size range specified to give a more or less moist and flaky material. The term plasticizer is used to indicate any apparatus which is capable of kneading the comminuted corn kernels to form an essentially homogeneous cohesive plastic-like material which can be rolled to form a continuous thin sheet.

FIGURE 3 is a vertical cross-section of the entire dough-forming apparatus while FIGURES 4 and 5 are detailed cross-sections of a portion of the cutting head of a cutting mill. In FIGURE 3 the cutting mill is generally indicated at the numeral 46, the plasticizer by the numeral 48 and an element joining these two by the numeral 47.

Turning first to the cutter 46 it will be seen to consist of a feed hopper 314 which introduces the processed corn kernels into the actual cutting device which comprises a stationary cutting head 315, an impeller 316 which rotates within the cutting head 315 and which has a series of impeller blades 317. The cutting head 315 is retained in its stationary position by being bolted to a top plate 318 and to a spindle housing 319. Surrounding the entire cutting device and its driving means is a housing 320 which is affixed to the feed hopper 314 through suitable seals 321.

Running upwardly through the spindle housing 319 is the impeller drive shaft 324 which is mechanically joined to the bottom plate 325 of the impeller as by a bolt 326 and dowel pins 326a (FIG. 4). The impeller drive shaft 324 is in turn attached to a spindle pulley 328 and is rotated by means of the drive belt 329 which is encased in a suitable belt housing 330. Finally a motor 332 is provided to drive belt 329 and in turn to rotate the impeller 316 within the cutting device.

The cutting mill proper comprises the stationary circular cutting head 315 and the impeller 316 which revolves within the cutting head. The cutting head has, as shown in FIGURES 4 and 5, a number of tiers of shaped, spaced knives 352 around its periphery joined to spacers 350.

The cutting head may be built up with two types of elements, the spacers 350 and knife elements 352. Both elements have the same thickness (typically about 0.020"). The knife elements 352 as seen in FIGURE 4 comprise two non-cutting portions 35a joined by a "knife" or "bridge" 352b which performs the actual cutting function. The spacers 350 have the same shape as the non-cutting portions 352a of the knife elements.

In assembling the cutting head, a series of knife elements 352 are positioned around the periphery of the head so the portions 352a fall on each of the "columns" to be formed. As there are 20 "columns" as seen in FIGURE 4, 10 elements are used. Then additional elements are then placed on the first 10 to build up the "column" further but the elements of the second layer are placed in overlapping relation as shown in FIGURE 5, much as bricks are overlapped in building a wall. A spacer is placed in each column on top of this second layer knife element and the process is then repeated until a sufficient height is achieved. In this way the structure illustrated in FIGURE 5 is achieved. Typically, the openings 353 are therefore approximately 0.040" in height. The knife portions are staggered in adjacent openings around the periphery and the "columns" are solid. In practice the elements 350 and 352 are stacked in sufficient numbers to provide a cutting head about 2 inches in height.

As the impeller rotates within the cutting head, the corn kernels falling into the center of the impeller 316 are forced outwardly by centrifugal force against the inside surface of the cutting head. The kernels are then cut between the impeller blades and the knives and are forced out of the cutting head through spacings 353 in the form of finely divided particles which are moist and flaky. At this point these particles exhibit only a small amount of cohesion and normally have a moisture content range from 45 to 60% by weight.

Turning again to FIG. 3 it will be seen that the cut corn particles as they emerge from the cutting head 315 drop downwardly through housing 320, pass through joining number 47 and are introduced into the plasticizing device 48. The plasticizing means of FIGURE 3 is shown to comprise a hopper 336 and a horizontally placed essentially cylindrical housing 337 which has rotating within it a worm or screw 338 which is integrally formed on a suitable rotating drive shaft 340. At the exit end of this screw type grinder is a perforated plate 342 having holes 343 formed therein. The grinder shaft is driven by motor 344 through reduction gearing generally indicated at 345. The moist flaky comminuted corn as it passes through the grinder 48 is kneaded and mixed. It is possible that some further comminution takes place in the grinder 48 but the amount of comminution is small compared to that which has been achieved by the cutting mill. This is borne out by the fact that little if any heat is generated in the dough during plasticizing. Moreover, the fact that the size of the holes 343 in the end plate 342 is not critical indicates that there is little, if any cutting through attrition as the plasticized material is forced through these holes. The dough 346 which is delivered by the plasticizer is sufficiently cohesive to be transferred directly to rollers for sheet formation.

As noted above the comminuted material as it is delivered from the cutting mill may have a maximum particle size ranging from about 0.02 to 0.05 inch which means that the spacing 353 (FIGURE 5) will be adjusted to fall within this range since this spacing controls the particle size. The blade thicknesses as shown in FIGURE 5 may range from about 0.010 to 0.030 with about 0.020 being preferred. For a cutting head having a 6" inside diameter, the speed of the impeller rotation may range from 1800 to 12,000 r.p.m. with from 6400 to 7000 r.p.m. being found quite satisfactory. The number of impeller blades and the impeller speed will in turn be determined by the rate at which the corn kernels are fed into the cutting mill. As a typical example of operation, when the corn is introduced at a rate of 3800 to 4500 lbs. per hour an impeller having 7 blades and rotating at 6400 r.p.m. produces the desired degree of comminution of the corn kernels. The number of blades is of course not critical so long as a sufficient number are provided. Corn feed rates and impeller speeds may of course be lower than those specified.

Generally it will be desirable to introduce the corn into the cutter at an elevated temperature that is, up to about 170° F. There is very little increase in the temperature of the corn during the cutting process due primarily to the fact that it is cut rather than ground between two surfaces, and to the fact that the cutting mill as illustrated in FIGURE 3 ingests a large quantity of air in its operation. Thus cutting and plasticizing may be carried out at temperatures up to about 170° F. It appears that the plasticizing of the dough at this temperature is advantageous and that a somewhat greater degree of cohesion is obtained.

The plasticizer illustrated in FIG. 3 is preferably a screw grinder having a perforated end plate but without the usual cutting knives. As pointed out above, the size of the perforations in the end plate is not critical and may range any where from ⅛ to one inch in diameter. Generally these perforations will be from ⅜ to ⅝ inch in diameter, the larger hole size being used when the dough delivered is at its higher temperatures.

The corn dough coming from the plasticizer is suitable for rolling and sheeting directly without any further treatment. The thin sheet of dough formed can be readily cut and docked and although it possesses good cohesion it breaks easily from any surface which it contacts.

As so far described, the cut corn is deposited directly into the plasticizing apparatus to make a dough. We have also found as is described in greater detail below in connection with FIGURE 6 that the cut corn may be dried before plasticizing and stored or shipped in its dry condition. Thereafter, when it is desired to form a dough, moisture is added to the dried cut corn in the proper amount, preferably until the total moisture is between 50 and 53% by weight of the resultant dough, and the reconstituted cut corn is placed in the plasticizing unit. By this process a corn dough which is substantially indistinguishable from the dough made from undried cut corn is obtained.

Processing of dough

Figure 1B:
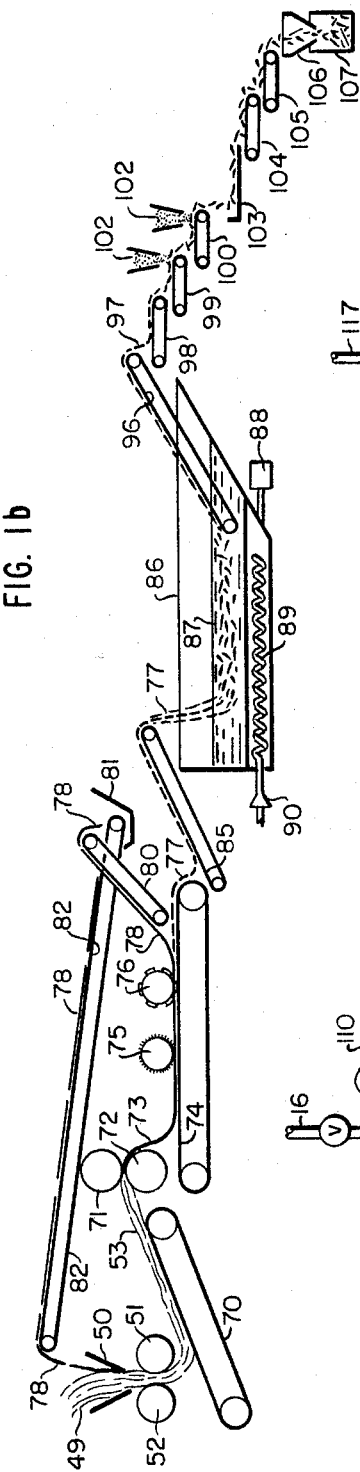
FIG. 1b is a continuation of the diagram of FIG. 1a showing the formation of the dough sheet, the docking, cutting, cooking and final processing.

The description of the process and apparatus may now be continued with reference to FIG. 1b which is a continuation of FIGURE 1a. The plasticized and kneaded corn dough 49 as it comes from the plasticizer 48 is collected in a hopper 50. From hopper 50 it is passed through two rollers 51 and 52 to form a first thick sheet 53. This thick sheet of dough 53 is picked up by an endless belt 70, or other suitable conveying means, and carried to the nip of rollers 71 and 72. The dough is then extruded through rollers 71 and 72. In order to handle this dough properly, the rollers must materially reduce the thickness of the dough sheet in such a manner that the thin sheet breaks clean from the rollers. This is done by rotating the rollers 71 and 72 (FIGURE 1b) at different peripheral speeds. In this case the lower roller 72 is moved somewhat faster than the upper roller 71. The actual distance between the rollers is maintained at from about .016 to .018 inch. It appears that after the dough sheet passes through the rollers onto sheeter belt 74, it expands since the thin sheet of dough 73 is about 0.045 inch thick. In order to keep the dough moving along and to break it cleanly from the rollers, it is necessary that the surface speed of the sheeter belt 74 is maintained slightly greater than the peripheral speed of roller 72. This appears to have the effect of slightly stretching the dough and keeping it from piling up on the sheeter belt 74. Typical values for the relationship between the speeds of rollers 71 and 72 and the speed of the belt 74 are given in the following table:

| Speed of belt 74, ft./min. | Speed of roller 71 | | Speed of roller 72 | |
|---|---|---|---|---|
| | R.P.M. | Ft./min. | R.P.M. | Ft./min. |
| 60 | 15-17 | 35-41 | 23-24 | 54-56 |
| 80 | 26 | 61 | 31 | 73 |
| 85 | 25 | 59 | 32 | 76 |
| 120 | 34-40 | 80-94 | 48-49 | 113-115 |

As the thin sheet of dough progresses forward on the sheeter belt 74, it is perforated by a suitable docker 75 and after perforation it is cut into desired shapes by a rotating cutter 76. The speed of the docker and cutter roll is synchronized with the speed of the sheeter belt 74 so that no additional stretch or wrinkling of the dough takes place.

At this point in the process there are on the sheeter belt 74 the chips 77 cut into the desired configuration. If the chip configuration is such that a portion of the dough remains as scrap around the chips 77, (as if the chips are round, for example) then provision should be made for the recovery and reuse of the scrap dough. Normally the scrap will be present in the form of strips. These strips of scrap 78 are directed by means of a suitable roller 79 onto an endless belt 80 and are carried onto a collector 81 from which they are returned by means of belt 82 to the hopper 50 for reprocessing.

The individual chips 77 are in the meantime carried to the end of sheeter belt 74 and from there dropped onto another endless belt 85 which carries them into the cooker 86. This cooker is of the conventional type and it contains hot cooking fat 87 which is circulated by standard techniques such as by being pumped by a pump 88 through the bottom portion where it is heated by out of contact heat exchange with hot gases in coils 89. The gas burner is shown diagrammatically at 90. The chips as they first enter the hot cooking fat drop to the bottom and then as moisture is removed from them, they begin to float and are carried by rake-like fingers (not shown) onto another endless belt 96 which removes them from the hot fat from which the cooked chips 97 are transferred to successive conveyors such as belts 98, 99 and 100. While on belt 99 they receive a first coat of salt from a salter 102. Then, as they are dropped to endless belt 100 they are turned over and salted on the other side by another salter 102. From endless belt 100 they are transferred to a vibrating conveyor 103 and then by suitable means such as conveyor 104 and belt 105 are taken into a weighing machine 106 where weighed quantities are dispensed into suitable bags such as 107. It is preferable to package the chips at a temperature somewhat above ambient temperatures; that is, between about 100° and 110° F. This has the advantage of preventing any moisture condensation in the sealed bags or other containers.

FIGURE 2 shows an alternative arrangement of apparatus for handling the processed corn kernels to the point where they are introduced into the feed hopper 44. The alternative apparatus in FIGURE 2 embodies the use of a vacuum tank to cool the corn and liquid to the desired 170° F. immediately upon its transfer to the steeping tank rather than cold water as in FIGURE 1a. In this figure like numbers refer to like elements in FIGURE 1a.

It will be seen in this arrangement that the pressure vessel 10 is provided with an additional line 110 for permitting the entrance of air into the pressure tank to blow out the kernels and liquid subsequent to the pressure processing. As explained above, this is not required, since the pressure in the pressure vessel at the end of the cooking period is sufficient to blow the corn to the steeping tank. The arrangement shows a conduit 111, connected to the bottom portion of the pressure vessel 10, which is designed to carry the corn kernels and liquid under pressure into the vacuum steeping tank 112 which is fitted with an agitator 113 and associated shaft 114 and motor 115, just as was the tank 26 in FIGURE 1a. There is also provided in this arrangement means for producing a vacuum within the tank 112. The tank itself is conventional and may be of the type made of Groen Mfg. Co., of Elk Grove, Illinois, for instance. A condensing pump 116 (such as Nash Hytor condensing pump) or a water jet condenser (such as that made by the Schutte-Koerting Co., of Philadelphia, Pennsylvania), is provided to produce the vacuum in tank 112. Condensing pump 116 has leading into it a water line 117 and is joined to the vacuum tank 112 through a suitable conduit 118. The condensing pump 116 is also provided with a drain line 119. The vacuum tank 112 has associated with it at its bottom portion a valve 120 which permits the steeped corn kernels along with the accompanying liquid to be transferred by means of conduit 121 onto a screen 122 which extends over a catch basin 123, the latter being equipped with a drain 124 for removing the liquid at periodic intervals. The corn kernels as they are removed from the liquid then may be conveniently conveyed to the feed hopper 44 by means of a suitable conveyor 125 which may be a jacketed conveyor either of a screw or vibrator type.

In the operation of the apparatus shown in FIGURE 2, the steps for handling the processed corn kernels will be as follows: after the pressure cooking has been completed, the vent 16 to the atmosphere is opened and the corn and liquid are blown into the vacuum tank 112 with pressurized air introduced through line 110. Alternatively, as noted above, the internal pressure which has been built up in the pressure tank may also be used to blow the corn and liquid into the vacuum tank. After the corn and liquid have been transferred to the vacuum tank 112, a vacuum is pulled on it to cool the batch rapidly to about 170° F. or any desired temperature. Subsequent to the pulling of the vacuum on the vacuum tank 112, the corn is permitted to steep in the liquid for about 30 minutes to two hours and then a further vacuum is pulled on the tank to cool it down to about 120° F. or the desired temperature. After cooling, the entire batch is transferred onto the screen 122 through valve 120 and conduit 121 and the water is removed and the processed corn kernels are transferred by means of the conveyor 125 into the hopper 44 to be cut and plasticized as described above.

Figures 6, 7:
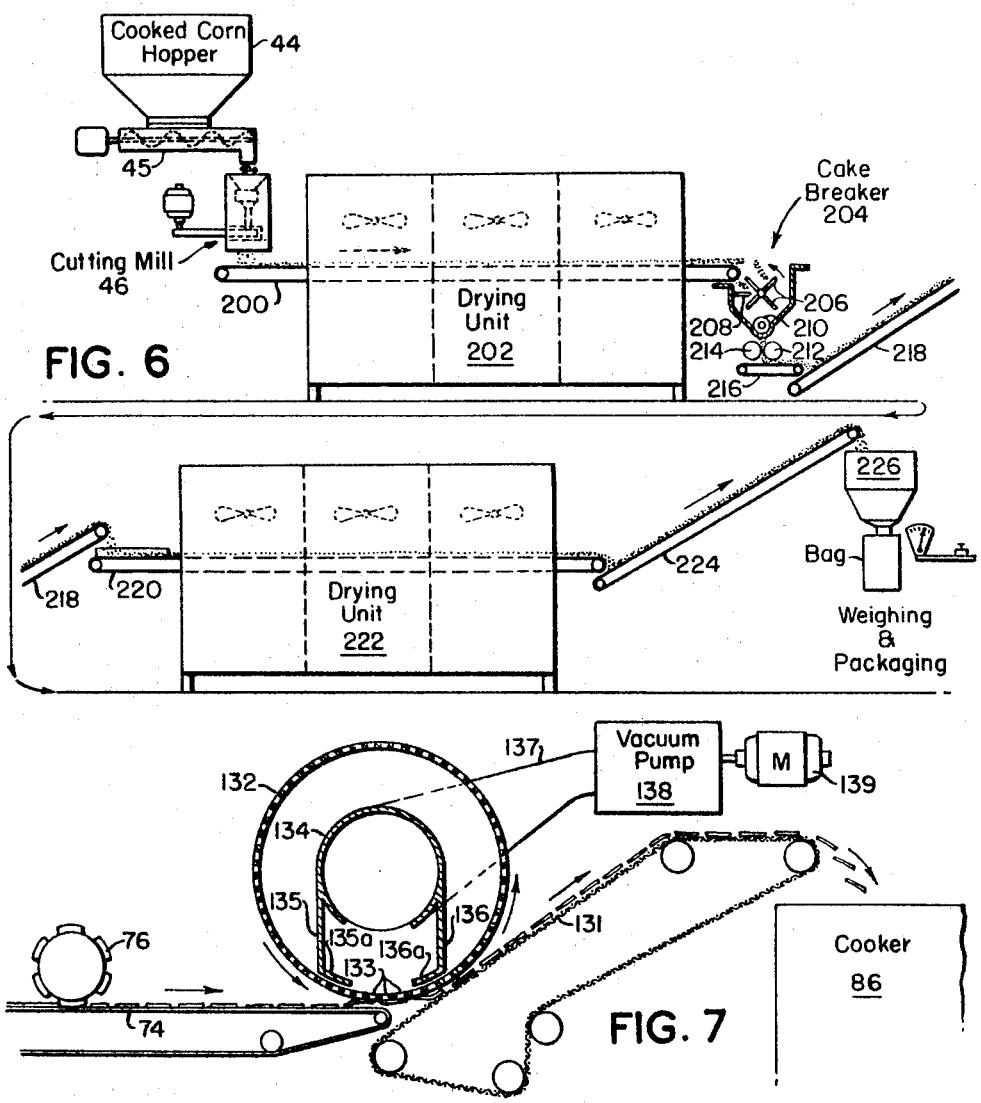
FIG. 6 is a diagram of apparatus for use in drying and storing the processed corn for later manufacture into a corn chip product.
FIG. 7 is a diagram of an alternative apparatus for use in connection with the apparatus of FIG. 1b in transferring the cut dough chips to the cooking tank.

FIGURE 6 illustrates a process which may be used to dry the processed corn for storing or shipping after it has been formed into particles by the cutting mill but before it has been kneaded and formed into dough.

As shown therein, the corn hopper 44, conveyor 45 and cutting mill 46 are provided just as in FIGURE 1a. The cut corn from the cutting mill falls on an endless conveyor belt 200 which passes through a first series of drying units 202. It may be desirable to oscillate the feed to the conveyor belt 200 to obtain an even distribution of the cut corn across the conveyor.

As the belt 200 carrying the wet cut corn passes through the dryer 202 heated air is forced downwardly through the bed of cut corn and the belt 200. The drying unit is of conventional construction and is of the type supplied, for example, by Surface Combustion, Inc.

After passing through the drying unit 202, the corn bed is broken up by a "cake breaker" generally indicated at 204. This unit comprises a motor driven shaft having a plurality of radially extending knives 206. Several sets of these knives are provided along the shaft, the shaft itself extending across the entire width of conveyor belt 200 at the location shown. A plurality of fixed knives 208 positioned to clear the rotating knives 206 are also provided. As the shaft on which the knives 206 are mounted rotates, large pieces of dried cut corn from the bed are broken or cut into smaller pieces by passing between the fixed and rotating knives and fall into a screw conveyor 210 (shown in end view in FIGURE 3). The conveyor 210 carries the pieces to a unit which further reduces them in size. This is shown in FIGURE 3 as a pair of driven rolls 212 and 214; the dried chunks of corn passing through the nip of these rolls; a chopper or centrifugal cutter might also be used.

Following this second reduction the reduced processed corn falls on the conveyor 216, which carries it in turn to a distributing conveyor 218. Conveyor 218 distributes the corn particles uniformly in a bed across the conveyor 220 associated with a drying unit 222, which is similar to drying unit 202. After passing through dryer 222 the corn is carried by conveyor 224 to a hopper 226 and is discharged therefrom, weighed and packaged, a weight controlled bagging machine 228 being provided for this purpose.

This dried material produced by this process may be reconstituted by the addition of moisture and the reconstituted material made into a dough by inserting it into the kneading device 48 as shown in FIGURES 1 and 3. By using the remainder of the method and apparatus shown in FIGURE 1b the improved corn chips made by our process and apparatus may be produced.

The dried processed material may be conveniently stored and readily shipped. This is an important economic consideration since it is desirable that the actual corn chips be made locally because of the perishable nature of the product. Hence a single large plant, properly located with regard to corn supply and chip manufacturers can process corn through the cutting step according to our process for all chip makers. This processed corn may then be dried and stored or shipped to a number of smaller local plants where it may be reconstituted and the remainder of the process followed to manufacture corn chips according to our process.

FIGURE 7 illustrates an alternative way of handling the corn chips once they have been cut from the dough. In this figure like elements are given like numbers as in FIGURE 1b. The corn chips, after they have been cut by the cutter 76, proceed along the sheeter belt 74 and are then deposited into the cooking tank. Rather than pick them up on another endless belt, such as belt 85 in FIGURE 1b, FIGURE 3 shows how they may be handled by means of a vacuum transfer system. This latter system permits the sheeter belt 74, which is formed of a material which does not lend itself well to sharp bending, to be designed for driving over a larger end roller thus permitting the belt to have a much longer life than in the arrangement shown in FIGURE 1b.

In the arrangement shown in FIGURE 7, we provide a second endless belt 131 which is preferably of wire mesh to carry the cut corn chips to the cooker 86. To transfer the cut corn chips from the sheeter belt 74 to belt 131 we provide a rotating steel drum 132 having formed in the sides thereof a plurality of openings 133. Within the drum we provide a fixed iron pipe 134 whose longitudinal axis is substantially the drum axis. A segment of the pipe 134 is removed along its entire length and a pair of plates 135 and 136 are secured to the pipe, as by welding, along the entire length of the opening. Each of the plates is also provided with an inturned flange 135a and 136a to define an opening extending across the entire conveyor and of a width somewhat greater than the largest chip which is to be transported. While there is a clearance between the lower surfaces of the flanges 135a and the inner surface of the drum 132; it is maintained as small as possible to avoid leakage as will be explained. One end of the pipe 134 is sealed and the other is connected via a vacuum line 137 to a vacuum pump 138 driven by a suitable motor 139. The plates are also sealed at both ends, as by end plates, to prevent the entrance of air. When the vacuum pump 138 is operating it will establish an area of reduced pressure within the pipe 134 and between the plates 135 and 136. The rotating perforated drum, will attract the cut corn chips to its periphery as a portion of the drum rotates into the space between the flanges 135a and 136a. The cut corn chip will adhere to the drum as it rotates and will be stripped off the drum as the portion to which the cut chip adheres rotates in front of the flange 136a. However, during its adherence, the chip will have been removed from the sheeter belt 74 and deposited on the wire mesh belt 131 for transportation to the cooker 86. From this point, the chips proceed as illustrated and described in connection with FIGURE 1b.

It will be seen from the above detailed description of this invention that there is provided a unique method for continuously making improved corn chips—improved in the sense that they can be formed in any desired size and shape and that they have an enhanced flavor, the quality of which can be uniformly controlled. The method comprises a series of steps unique to corn chip manufacture. These steps include pressure-cooking, short steeping with cooling if desired, reduction of the processed kernels and formation of dough by the combination of cutting, kneading and mixing, rolling of the resulting dough into a thin sheet, cutting the thin sheet into the desired shapes and cooking the shaped material to form the final chips.

It will thus be seen that the objects set forth above, among those made apparent from the preceding description, are efficiently attained and, since certain changes my be made in carrying out the above method without departing from the scope of the invention, it is intended that all matter contained in the above description or shown in the accompanying drawings shall be interpreted as illustrative and not in a limiting sense.

Having thus described our invention, we claim:

1. The method of making corn chips comprising, in combination, the steps of pressure cooking corn kernels with lime and water in a first vessel, said lime being present in a quantity equivalent to at least 1.5% by weight of dry corn, cooling the cooked corn and water-lime solution, steeping the cooked corn in said water-lime solution in a second vessel, draining the water-lime solution from the corn kernels, cutting the cooked corn to form a comminuted material having a moisture content of between 40 and 60 percent by weight, the major portion of said material having a particle size in the range of between 0.020 to 0.050 inch, kneading and mixing said communited material to form a dough, forming said dough into a thin sheet, docking said sheet, cutting said sheet to form a plurality of corn chips and deep fat frying said cut corn chips.

2. The method defined in claim 1 in which said corn is steeped in said second vessel for a period not greater than two hours.

3. The method defined in claim 1 in which said corn and water-lime solution is cooled to about 170° F. following pressure cooking.

4. The method defined in claim 1 in which the cooked corn and the water-lime solution are transferred from said first to said second vessel by using the pressure in said first vessel to blow the corn and liquid into said second vessel when cooking is completed.

5. The method defined in claim 4 in which said corn is steeped in said second vessel for about 40 minutes.

6. The method defined in claim 1 in which said dough is formed into a sheet by passing it through the nip of a pair of rotating rollers, said rollers rotating at different speeds.

7. The method of making corn chips comprising, in combination, the steps of pressure cooking corn kernels in a water-lime solution in a first vessel, the lime being at least 1.5% by weight of the corn kernels, cooling the cooked corn and water-lime solution to about 170° F. steeping the cooked corn kernels in said water-lime solution for not more than about two hours in a second vessel, draining said steeped corn kernels, cutting said corn kernels to form a comminuted material having a moisture content of between 40 and 60 percent by weight, the major portion of said material having a particle size in the range of between 0.020 and 0.050 inch, kneading and mixing said comminuted material to form a dough, passing said dough through the nip of a set of rotating rollers to form a dough sheet, said rollers rotating at different speeds, perforating said dough sheet, cutting said dough sheet to form a plurality of corn chips, deep fat frying said chips, and draining said dried chips to remove excess fat therefrom.

8. The method defined in claim 7 in which said cooling after cooking is accomplished by adding cold water to the corn and water-lime solution after pressure cooking.

9. The method defined in claim 7 in which said second vessel is a vacuum tank, and in which cooling is accomplished by reducing the pressure within said second vessel after said corn and water-lime solution has been deposited therein.

10. The method defined in claim 7 in which the cooked corn and the water-lime solution are transferred from said first to said second vessel by causing the pressure in said first vessel to blow said corn and liquid into said second vessel, and in which said corn is steeped in said second vessel for about 40 minutes.

11. The method defined in claim 7 which includes the steps of drying the cut corn kernels after cutting and before kneading and mixing, and reconstituting the dried corn kernels by adding moisture thereto before kneading and mixing.

12. A method of forming a sheetable-dough from corn kernels which have been cooked with lime comprising, in combination, the steps of cutting the corn kernels to thereby form a comminuted flaky material the major portion of said material having a particle size in the range of between 0.020 to 0.050 inch and kneading and mixing said comminuted material to form a dough.

13. The method in accordance with claim 12 wherein said cutting is carried out at elevated temperatures up to about 170° F.

14. The method defined in claim 12 in which said comminuted corn is dried after cutting and reconstituted by the addition of moisture before kneading and mixing to form said dough.

References Cited by the Examiner

UNITED STATES PATENTS

| | | | |
|---|---|---|---|
| 1,203,175 | 10/1916 | Blacklock | 99—237 |
| 2,002,053 | 5/1935 | Doolin | 99—80 |
| 2,060,408 | 11/1936 | Wood | 99—237 |
| 2,905,559 | 9/1959 | Anderson et al. | 99—80 |
| 2,916,378 | 12/1959 | Kunce et al. | 99—80 |
| 3,020,162 | 2/1962 | Cunningham et al. | 99—80 |
| 3,083,103 | 3/1963 | Anderson et al. | 99—80 |

A. LOUIS MONACELL, *Primary Examiner.*

ROSCOE S. AULL, *Assistant Examiner.*